United States Patent
Kim et al.

(10) Patent No.: US 8,165,125 B2
(45) Date of Patent: Apr. 24, 2012

(54) APPARATUS AND METHOD OF CLASSIFYING PACKETS

(75) Inventors: Jung Hak Kim, Daejeon (KR); Tae Whan Yoo, Daejeon (KR); Song In Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 137 days.

(21) Appl. No.: 12/206,078

(22) Filed: Sep. 8, 2008

(65) Prior Publication Data
US 2009/0135826 A1    May 28, 2009

(30) Foreign Application Priority Data
Nov. 27, 2007   (KR) .................. 10-2007-0121301

(51) Int. Cl.
*H04L 12/28* (2006.01)
*H04L 12/56* (2006.01)
(52) U.S. Cl. ........................ 370/392; 370/389
(58) Field of Classification Search ............... None
See application file for complete search history.

(56) References Cited

U.S. PATENT DOCUMENTS

| | | | |
|---|---|---|---|
| 6,529,508 B1 * | 3/2003 | Li et al. ........... | 370/392 |
| 6,567,408 B1 * | 5/2003 | Li et al. ........... | 370/395.31 |
| 6,718,326 B2 * | 4/2004 | Uga et al. ........ | 1/1 |
| 6,859,455 B1 * | 2/2005 | Yazdani et al. ... | 370/392 |
| 7,061,874 B2 | 6/2006 | Merugu et al. | |
| 7,133,400 B1 * | 11/2006 | Henderson et al. | 370/389 |
| 7,193,997 B2 * | 3/2007 | Van Lunteren et al. | 370/392 |
| 7,227,842 B1 * | 6/2007 | Ji et al. .......... | 370/235 |
| 7,251,651 B2 | 7/2007 | Lunteren | |

(Continued)

FOREIGN PATENT DOCUMENTS
KR    10-2005-0066807 A    6/2005

OTHER PUBLICATIONS

Nen-Fu Huang et al., "Fast and scalable multi-TCAM classification engine for wide policy table lookup", AINA'05, (Mar. 2005, pp. 792-797).

*Primary Examiner* — Phirin Sam
*Assistant Examiner* — Peter Chau
(74) *Attorney, Agent, or Firm* — Staas & Halsey LLP (57) ABSTRACT

The present invention relates to an apparatus and method of classifying packets that can support a quality of service (QoS) in a network system. An apparatus for classifying packets according to an exemplary embodiment of the present invention includes: a first unit that analyzes input data packets, extracts pluralities of specific fields from the data packets using an analyzed result, and outputs the pluralities of specific fields; pluralities of second units that compare data of a first portion of the pluralities of extracted specific fields with data in a table, determine whether items that satisfy a predetermined condition exist in the table, and output hit signals and pointers indicating positions of the items that satisfy the predetermined condition when the items that satisfy the predetermined condition exist in the table; and a third unit that compares data of a second portion of the pluralities of extracted specific fields and key data including the pointers input from the pluralities of second units and rule data in a rule table and outputs classes corresponding to the items when the key data and the rule data are matched.

3 Claims, 6 Drawing Sheets

U.S. PATENT DOCUMENTS

| | | |
|---|---|---|
| 7,274,700 B2 | 9/2007 | Jin et al. |
| 7,525,958 B2 * | 4/2009 | Kumar et al. .................. 370/386 |
| 7,554,980 B1 * | 6/2009 | Yeh et al. ....................... 370/392 |
| 7,567,567 B2 * | 7/2009 | Muller et al. .................. 370/392 |
| 7,675,915 B2 * | 3/2010 | Parker et al. ................... 370/392 |
| 7,774,497 B2 * | 8/2010 | Horgan .......................... 709/238 |
| 2002/0023080 A1 * | 2/2002 | Uga et al. ........................... 707/1 |
| 2002/0191605 A1 * | 12/2002 | Lunteren et al. ............... 370/389 |
| 2004/0170170 A1 * | 9/2004 | Joung et al. .................... 370/389 |
| 2004/0190526 A1 * | 9/2004 | Kumar et al. ............. 370/395.21 |
| 2004/0258043 A1 * | 12/2004 | Engbersen et al. ............ 370/351 |
| 2004/0258067 A1 * | 12/2004 | Irish et al. ...................... 370/392 |
| 2004/0264373 A1 * | 12/2004 | Engbersen et al. ............ 370/230 |
| 2005/0021491 A1 * | 1/2005 | Horgan .............................. 707/1 |
| 2005/0044252 A1 * | 2/2005 | Floyd et al. .................... 709/230 |
| 2005/0083935 A1 * | 4/2005 | Kounavis et al. .............. 370/392 |
| 2005/0152369 A1 * | 7/2005 | Ambe et al. .................... 370/392 |
| 2005/0226235 A1 * | 10/2005 | Kumar et al. ................... 370/386 |
| 2006/0013210 A1 * | 1/2006 | Bordogna et al. .............. 370/389 |
| 2006/0104286 A1 * | 5/2006 | Cheriton .................... 370/395.32 |
| 2006/0221956 A1 * | 10/2006 | Narayan et al. ................ 370/389 |
| 2007/0115986 A1 * | 5/2007 | Shankara ........................ 370/392 |
| 2007/0168377 A1 * | 7/2007 | Zabarsky ........................ 707/102 |
| 2008/0279185 A1 * | 11/2008 | Zhang et al. ................... 370/392 |

* cited by examiner

APPARATUS AND METHOD OF CLASSIFYING PACKETS

CROSS-REFERENCE TO RELATED APPLICATION

This application claims priority to and the benefit of Korean Patent Application No. 10-2007-0121301 filed in the Korean Intellectual Property Office on Nov. 27, 2007, the entire contents of which are incorporated herein by reference.

BACKGROUND OF THE INVENTION (a) Field of the Invention

The present invention relates to an apparatus and method of classifying packets, and more particularly, to an apparatus and method of classifying packets that can support quality of service (QoS) in a network system.

The present invention was supported by the IT R&D program of MIC/IITA [2006-S-009-02, The Development of WiBro Service and Operating Standard].

(b) Description of the Related Art

With good QoS, important packets are prevented from being lost, unnecessary packets are reduced, and immediate processing of packets that need the same is performed, thereby providing a high quality service to a user. In order to provide the QoS, a process of analyzing characteristics of packets and classifying the packets needs to be firstly performed.

Packets are classified using data that is obtained by analyzing the packets and specific field data that is included in headers of various packets in layers ranging from a layer 2 to a layer 4.

Examples of representative specific fields that are used to classify packets include a destination MAC address, a source MAC address, a virtual local area network (VLAN) ID, a VLAN user priority, an Ethernet type, an IP precedence, a differentiated service code point (DSCP), an Internet protocol (IP) type, a source IP address, a destination IP address, a layer-4 source port, and a layer-4 destination port.

When the packets are classified, only one of the above-described fields, combinations of some fields, or combinations of all fields may be used. In recent years, as various types of QoS have been required, the number and types of the fields that are used when classifying the packets have been gradually increased.

The packet classification includes a process of determining whether predetermined key data, which is composed of data corresponding to the fields obtained by analyzing the packets, satisfies a predetermined condition. A is packet classification rule is compared with the key data that is composed of data corresponding to the fields. The packet classification determines which of pluralities of packet classification rules including the key data is most preferable and derives a reasonable result.

A field search is needed to classify packets. Examples of a method of searching fields include a prefix match search, a range match search, and an exact match search.

The destination MAC address, the source MAC address, the source IP address, and the destination IP address generally indicate addresses at points where packets are generated and addresses at points that the packets reach, and are used together with a netmask. The netmask is used to locally or logically separate a network. In order to prevent non-authenticated or unnecessary packets from being circulated in a strictly managed network in terms of QoS, packets that are generated at authenticated addresses are allowed, packets that are generated at specific addresses are interrupted, and packets that are generated at addresses in a non-allowable range using a netmask are interrupted. In the case of using the netmask, only a maximum value in an allowable range is generally designated. In consideration of this point, a masking method is used to process data, such as a MAC address or an IP address. That is, when address data extracted from the packets is converted into bits, some bits are masked and the other bits are inspected to determine whether the address data has a desired value or type. Further, the prefix match search uses the above-described process to determine whether items that satisfy a predetermined condition exist in a predetermined search table.

In the cases of the layer-4 source port and the layer-4 destination port, some communication protocols may use specific port numbers and other communication protocols may use arbitrary port numbers within a predetermined range. In consideration of this case, a process of determining whether data extracted from packets is within a predetermined range and items that satisfy the predetermined condition exist in a predetermined search table is a range match search.

The virtual LAN identifier, the Ethernet type, and the IP type are defined to use specific values with respect to a specific network or specific communication protocol. In consideration of this case, a process of determining whether data extracted from packets has a specific value or type is performed to determine whether items that satisfy the predetermined condition exist in a predetermined search table, which is called an exact match search.

At the present time, as a generally used packet classification method, there is a packet classification method that uses a ternary content addressable memory (TCAM). The TCAM provides a structure in which the prefix match search can be simultaneously performed on all items constituting the TCAM, when predetermined key data is input. In an environment where a high-speed network processor or a CPU is provided or a space occupied by the TCAM is not important, a packet classification method using the TCAM may be effective.

However, if the amounts of key data input to the TCAM and classification rules stored in the TCAM are increased, that is, kinds of the fields that include the key data and the classification rules as constituent elements are increased, a memory utilization rate of the TCAM is lowered and the number of items constituting the TCAM is excessively increased. That is, when most of field data is fixed and only specific field data is changed, if this is represented as a classification rule, a large amount of memory resources are unnecessarily used.

The TCAM is not structurally suitable for the range match search. In order to obtain a range match search effect using the TCAM, pluralities of prefix match rules need to be sacrificed. That is, pluralities of items are needed to represent a range match rule as a prefix match rule using the TCAM.

In order to alleviate the above-described drawback, in recent years, a TCAM structure that can simultaneously perform a prefix match search and a range match search has been suggested. However, if kinds of the fields included in the classification rule and the key data are increased, a memory utilization rate is lowered.

As a method suggested for the purpose of alleviating the drawback in the packet classification method using the TCAM, there is a method in which a primary search is performed on each of the fields and a secondary search is then performed on key data that includes primary search results as constituent elements.

A primary search unit may be configured to perform the prefix match search, the range match search, and the exact match search, respectively or in a partially combined way. When an item satisfying a predetermined condition with respect to a specific field exists in a predetermined search table, the primary search unit outputs a search result in a predetermined form.

The primary search result may become a bit vector that represents a searched result for all items in the predetermined search table as bits, or an identifier (ID) for a specific item that satisfies a predetermined condition. The primary search result may be differently represented depending on how a secondary search unit outputting a final packet classification result is configured. That is, the primary search result may be differently represented depending on a method of configuring key data input to the secondary search unit.

However, the method of outputting a bit vector as a search result has a drawback in that, when items of the search table increase, the amount of key data for a secondary search excessively increases, which causes many restrictions at the time of substantially implementing the method.

In addition, the method of outputting an ID for a specific item as a search result has a problem in that, when a result that is obtained by performing a prefix match search or a range match search is output, the result indicates the most preferable search result rather than the best search result. That is, when the prefix match search or the range match search is performed, pluralities of items that satisfy a predetermined condition may be generated with respect to a specific field, and the most preferable result among the search results is output. If the search table is configured such that the predetermined conditions for the individual items in the search table do not overlap each other, the search results are independent from each other. In this case, however, flexibility of a search table operation is lowered, which makes it difficult to make various packet classification rules.

The secondary search unit processes key data that includes the primary search results as constituent elements. Accordingly, the predetermined search table in the secondary search unit is composed of rule data that includes the primary search results as constituent elements.

Next, a problem that occurs when a secondary search is performed using the primary search result that corresponds to outputting an ID for the specific item is exemplified. Table 1 shows an original packet classification policy.

TABLE 1

| Item | Source IP Address | Destination IP Address | Result |
|------|-------------------|------------------------|--------|
| R1 | 123.456.7.* | 123.456.*.* | C1 |
| R2 | 123.456.*.* | 123.456.8.* | C2 |

In this case, R1 and R2 indicate packet classification rules. In the case of R1, if a source IP address is 123.456.7.* and a destination IP address is 123.456.*.*, a packet classification result becomes C1. Here, * is associated with a method that indicates an IP address, and may have an arbitrary value in a range of 0 to 2556.

Table 2 is a primary search table that includes source IP addresses as items.

TABLE 2

| Source IP Address | Result |
|-------------------|--------|
| 123.456.7.* | X1 |
| 123.456.*.* | X2 |

In Table 2, when a source IP address of input packets is 123.456.7.*, both X1 and X2 may be a search result, but it is preferable for X1 to be the search result.

Table 3 is a primary search table that includes destination IP addresses as items.

TABLE 3

| Destination IP Address | Result |
|------------------------|--------|
| 123.456.8.* | Y1 |
| 123.456.*.* | Y2 |

In Table 3, when a destination IP address of input packets is 123.456.8.*, both Y1 and Y2 may be a search result, but it is preferable for Y1 to be the search result.

Table 4 is a packet classification rule table that uses the primary search results of Tables 2 and 3 in consideration of Table 1.

TABLE 4

| Result for Source IP Address Search Table | Result for Destination IP Address Search Table | Result |
|---|---|---|
| X1 | Y2 | C1 |
| X2 | Y1 | C2 |

For example, when a source IP address of input packets is 123.456.7.* and a destination IP address is 123.456.8.*, it is determined on the basis of Table 1 that C1 or C2 needs to be output as the search result. However, the primary search result that is determined on the basis of Table 2 is X1 and the primary search result that is determined on the basis of Table 3 is Y1, and thus the search results shown in Tables 2 and 3 are not matched with the search results shown in Table 4, Accordingly, a packet classification policy needs to be modified as shown in Table 5 and a packet classification rule table needs to be modified as shown in Table 6.

TABLE 5

| Item | Source IP Address | Destination IP Address | Result |
|------|-------------------|------------------------|--------|
| R1 | 123.456.7.* | 123.456.*.* | C1 |
| R2 | 123.456.*.* | 123.456.8.* | C2 |
| R3 | 123.456.7.* | 123.456.8.* | C3 |

TABLE 6

| Result for Source IP Address Search Table | Result for Destination IP Address Search Table | Result |
|---|---|---|
| X1 | Y2 | C1 |
| X2 | Y1 | C2 |
| X1 | Y1 | C3 |

As described above, in order to remove ambiguity that may occur whenever an item is added to the primary search table, in consideration of all pluralities of search results that can be provided by the primary search table, related contents need to be written in the packet classification rule, which causes inconvenience. When a large number of fields are included in the packet classification rule, memory utilization efficiency is lowered due to unnecessary items.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for classifying packets, having advantages of improving efficiency of a memory.

An exemplary embodiment of the present invention provides an apparatus for classifying packets. The apparatus includes: a first unit that analyzes input data packets, extracts pluralities of specific fields from the data packets using an analyzed result, and outputs the pluralities of specific fields; pluralities of second units that compare data of a first portion of the pluralities of extracted specific fields with data in a table, determine whether items that satisfy a predetermined condition exist in the table, and output hit signals and pointers indicating positions of the items that satisfy the predetermined condition when the items that satisfy the predetermined condition exist in the table; and a third unit that compares key data including a second portion of the pluralities of extracted specific fields and the pointers input from the pluralities of second units with rule data in a rule table, and outputs classes corresponding to the items when the key data and the rule data are matched.

Another exemplary embodiment of the present invention provides a method of classifying packets. The method includes: analyzing input data packets and extracting specific fields from the data packets to output the specific fields; comparing data of a first portion of the specific fields with data in a table and outputting hit signals and pointers indicating positions of the items that satisfy a predetermined condition when the items that satisfy the predetermined condition exist in the table; and comparing data of a second portion of the specific fields and the pointers with rule data in a rule table and classifying the data packets.

As described above, according to the exemplary embodiments of the present invention, single field search units are provided in consideration of individual characteristics of single fields and a primary search unit provides pluralities of searched results, which improves efficiency of a memory. Masking is performed for each of elements constituting a packet classification rule, and hardware having high integration can be configured.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er" and "-or" described in the specification mean units for processing at least one function and operation and can be implemented by hardware components or software components and combinations thereof.

A method and apparatus for classifying packets according to an exemplary embodiment of the present invention will now be described in detail with reference to the accompanying drawings.

Figure 1:
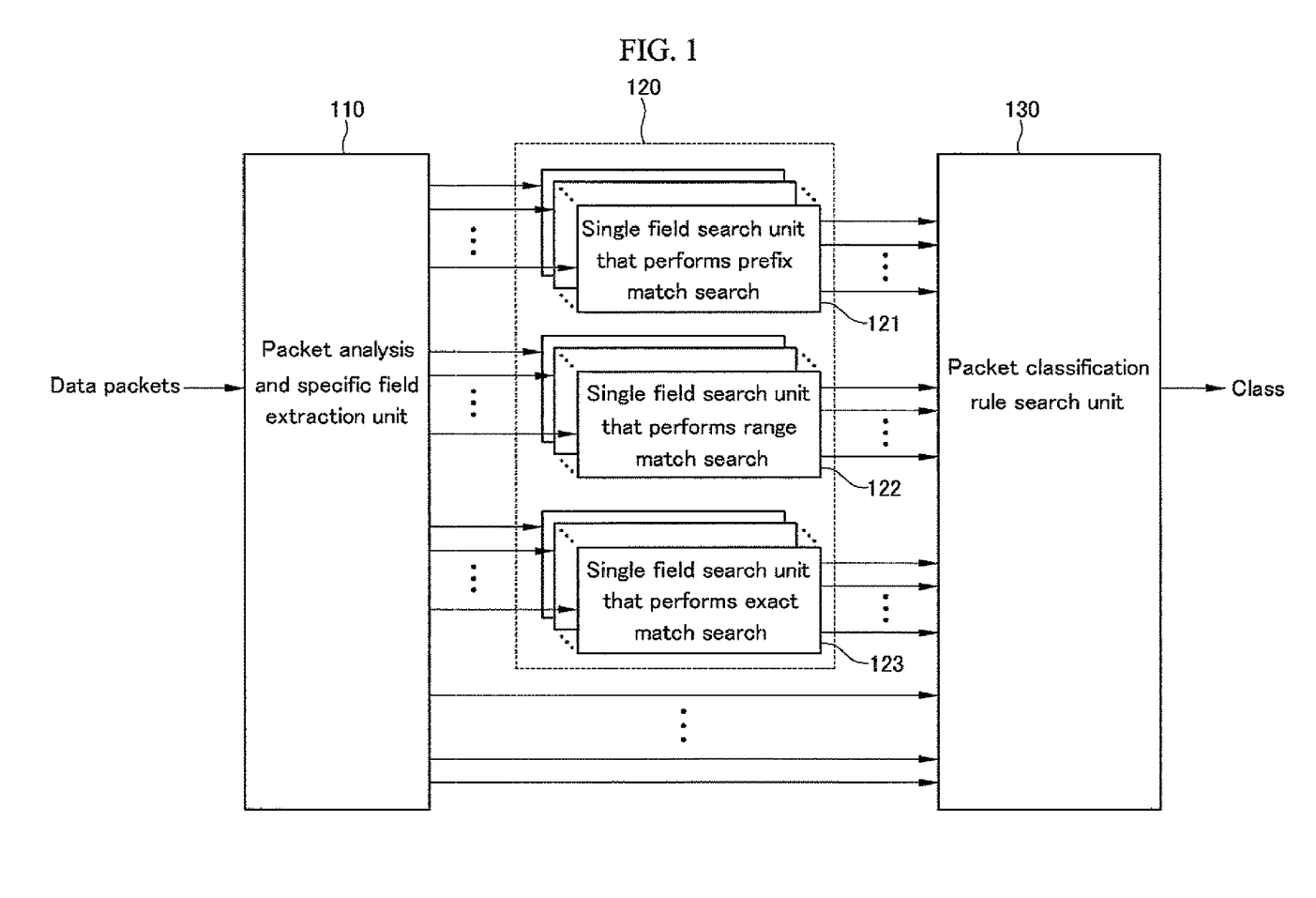
FIG. 1 is a block diagram illustrating a structure of a packet classification apparatus according to an exemplary embodiment of the present invention.

First, a packet classification apparatus according to an exemplary embodiment of the present invention will be described with reference to FIGS. 1 to 5. FIG. 1 is a block diagram illustrating a structure of a packet classification apparatus according to an exemplary embodiment of the present invention.

As shown in FIG. 1, a packet classification apparatus according to an exemplary embodiment of the present invention includes a packet analysis and specific field extraction unit 110, pluralities of single field search units 120, and a is packet classification rule search unit 130.

The packet analysis and specific field extraction unit 110 analyzes packets and extracts specific fields that are needed to classify the packets. The packet analysis is a process in which data packets are analyzed to determine whether the data packets correspond to a specific protocol, and a determined result is informed. The packet analysis and specific field extraction unit 110 outputs ingress/egress port information data and logical link information data, as well as the extracted specific field data.

The pluralities of single field search units 120 search the extracted specific fields to determine whether there are items that satisfy a predetermined condition with respect to the extracted specific field. When there are the items that satisfy the predetermined condition, the pluralities of single field search units 120 output hit signals and pointers for the corresponding items.

The pluralities of single field search units 120 include a single field search unit 121 that performs a prefix match search, a single field search unit 122 that performs a range match search, and a single field search unit 123 that performs an exact match search.

If receiving specific field data from the packet analysis and specific field extraction unit 111, the single field search unit 121 that performs the prefix match search masks a portion of bits obtained by converting the specific field data and inspects only the other bits to determine whether the specific field data has a desired value or type. The single field search unit 121 that performs the prefix match search determines whether items that satisfy a predetermined condition exist in a predetermined table through the above-described process. When it is determined that the items exist, the single field search unit 121 outputs hit signals and pointers for the corresponding items. Each of the pointers means a place where each of the items is located in the predetermined table.

Figure 2:
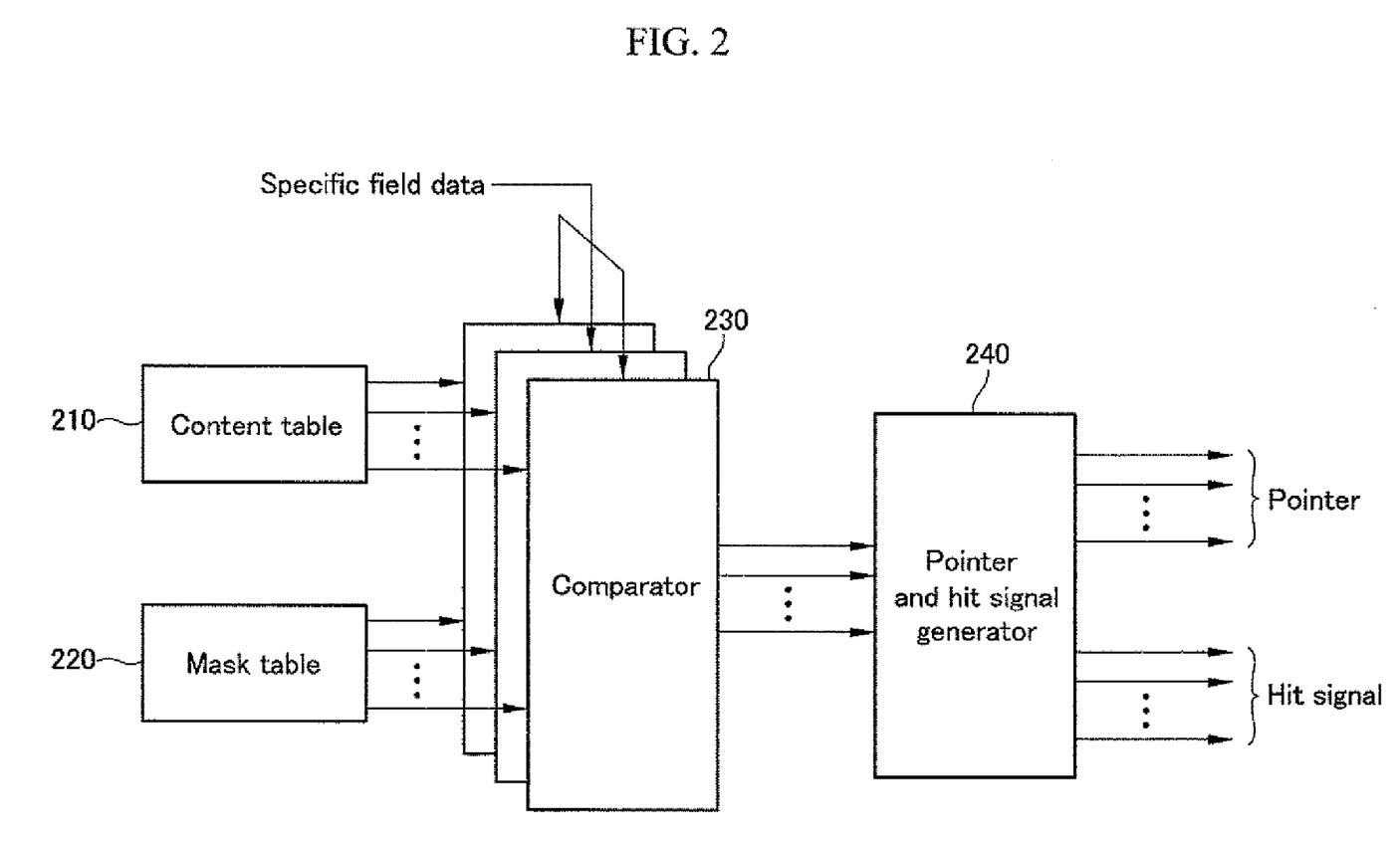
FIG. 2 is a block diagram illustrating a structure of a single field search unit that performs a prefix match search in accordance with an exemplary embodiment of the present invention.

The single field search unit 121 that performs the prefix match search is configured in consideration of characteristics of specific fields, such as a destination MAC address, a source MAC address, a source IP address, and a destination IP address, which require the prefix match search. That is, bounds of values that are indicated by the table items of the single field search unit 121 that performs the prefix match search and the number of table items may be differently set for each of the specific fields.

FIG. 2 is a block diagram illustrating a structure of a single field search unit 121 that performs a prefix match search in accordance with an exemplary embodiment of the present invention. As shown in FIG. 2, the single field search unit 121 that performs a prefix match search includes a content table 210, a mask table 220, a comparator 230, and a pointer and hit signal generator 240.

The mask table 220 stores masks that are used to mask some bits of the specific field data, and the content table 210 stores data that have values or types to be compared with the specific field data. The sizes of the mask table 220 and the content table 210, that is, the number of items constituting the mask table and the number of items constituting the content table, are the same.

If receiving specific field data from the packet analysis and specific field extraction unit 110, the comparator 230 reads masks and content data from the mask table 220 and the content table 210, respectively. The comparator 230 masks some bits of the specific field data and the content data using the masks and compares non-masked bits of the specific field data with non-masked bits of the content data, item by item. For each item, when the non-masked bits of the specific field data matches the non-masked bits of the content data, the comparator 230 outputs a compared result indicating matching to the pointer and hit signal generator 240. On the other hand, when the non-masked bits of the specific field data does not match the non-masked bits of the content data, the comparator 230 outputs a compared result indicating non-matching to the pointer and hit signal generator 240. Finally, for all items, the comparator 230 outputs compared results and positional information on where the content data are stored in the content table 210 to the pointer and hit signal generator 240.

When it is determined that there are matched items among items constituting the content table 210 on the basis of the compared results and positional information input from the comparator 230, the pointer and hit signal generator 240 generates pointers and hit signals. The hit signals indicate that there are matched items and the pointers indicate positional information on the corresponding items.

If receiving specific field data from the packet analysis and specific field extraction unit 110, the single field search unit 122 that performs the range match search determines whether a value of the specific field data is within a range of desired values. That is, the single field search unit 122 determines whether the specific field data satisfies the predetermined condition, that is, the value of the specific field data is smaller than or equal to a predetermined upper bound value and is equal to or larger than a predetermined lower bound value. The single field search unit 122 that performs the range match search performs the above-described process to determine whether items that satisfy the predetermined condition exist in the predetermined table. In this case, when it is determined that the items exist, the single field search unit 122 outputs hit signals and pointers for the corresponding items. Each of the pointers indicates a place where each of the items is located in the table.

Figure 3:
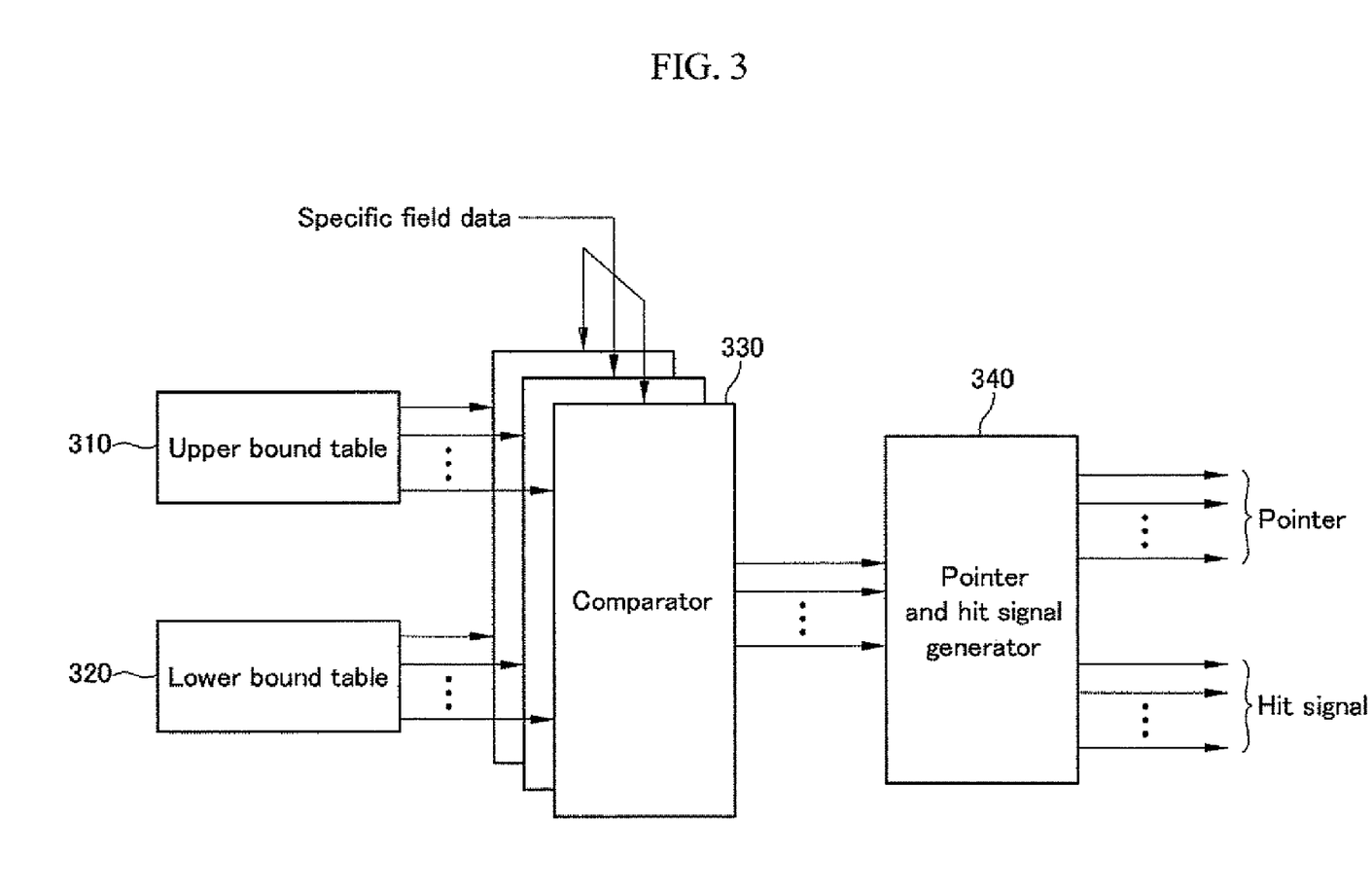
FIG. 3 is a block diagram illustrating a structure of a single field search unit that performs a range match search in accordance with an exemplary embodiment of the present invention.

The single field search unit 122 that performs the range match search is configured in consideration of characteristics of specific fields, such as a layer-4 source port and a layer-4 destination port, which require the range match search. That is, bounds of values that are indicated by the items of the upper bound table 310 and the lower bound table 320 and the number of table items may be differently set for each of the specific fields.

FIG. 3 is a block diagram illustrating a structure of a single field search unit that performs a range match search in accordance with an exemplary embodiment of the present invention. As shown in FIG. 3, the single field search unit 122 that performs the range match search includes an upper bound table 310, a lower bound table 320, a comparator 330, and a point and hit signal generator 340.

The upper bound table 310 stores upper bound values that are to be compared with the specific field data and the lower bound table 320 stores lower bound values that are to be compared with the specific field data. The sizes of the upper bound table 310 and the lower bound table 320, that is, the number of items constituting the upper bound table 310 and the number of items constituting the lower bound table 320, are the same.

If receiving specific field data from the packet analysis and specific field extraction unit 110, the comparator 330 reads upper bound values and lower bound values from the upper bound table 310 and the lower bound table 320, respectively. The comparator 330 compares a value of the specific field data with the upper bound value and lower bound value, item by item. For each item, when the specific field data satisfies the predetermined condition, that is, the value of the specific field data is smaller than or equal to the upper bound value and is equal to or larger than the lower bound value, the comparator 330 outputs a compared result indicating matching to the pointer and hit signal generator 340. On the other hand, when the specific field data does not satisfy the predetermined condition, the comparator 330 outputs a compared result indicating non-matching to the pointer and hit signal generator 340. Finally, for all items, the comparator 330 outputs compared results and positional information on positions where the upper and lower bound values are stored in the upper bound table 310 and the lower bound table 320 to the pointer and hit signal generator 340.

When it is determined that there are matched items among items constituting the upper bound table 310 and the lower bound table 320 on the basis of the compared results and positional information input from the comparator 330, the pointer and hit signal generator 340 generates pointers and hit signals. The hit signals indicate that there are matched items and the pointers indicate positional information on the corresponding items.

If receiving specific field data from the packet analysis and specific field extraction unit 110, the single field search unit 123 that performs the exact match search determines whether the specific field data has a desired value or type. The single field search unit 123 performs the above-described process to determine whether an item that satisfies the predetermined condition exists in the predetermined table. In this case, when it is determined that the item exists, the single field search unit 123 outputs a hit signal and a pointer for the corresponding item. The pointer indicates a place where the item is located in the table.

Figure 4:
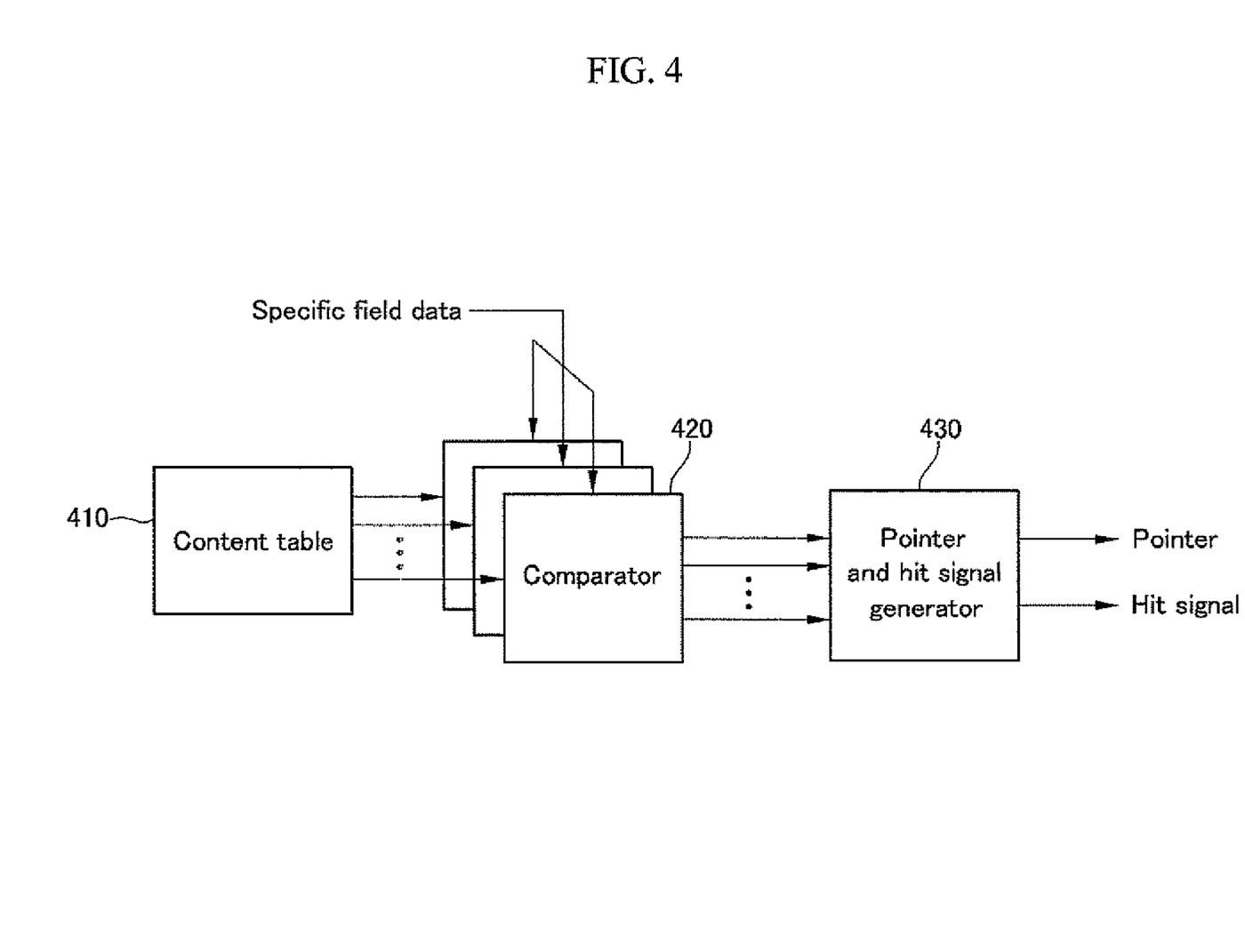
FIG. 4 is a block diagram illustrating a structure of a single field search unit that performs an exact match search in accordance with an exemplary embodiment of the present invention.

The single field search unit 123 that performs the exact match search is configured in consideration of characteristics of specific fields, such as a virtual LAN identifier, an Ethernet type, and an IP type, which require the exact match search. That is, bounds of values that are indicated by the items of a content table 410 and the number of items of the content table 410 may be differently set for each of the specific fields, FIG. 4 is a block diagram illustrating a structure of a single field search unit that performs an exact match search in accordance with an exemplary embodiment of the present invention. As shown in FIG. 4, the single field search unit 123 that performs the exact match search includes the content table 410, a comparator 420, and a pointer and hit signal generator 430.

The content table 410 stores data that have values or types to be accurately compared with the specific field data.

If receiving specific field data from the packet analysis and specific field extraction unit 110, the comparator 420 reads content data from the content table 410. The comparator 420 compares the specific field data with the content data, item by item. For each item, when the specific field data matches the content data, the comparator 420 outputs a compared result indicating matching to the pointer and hit signal generator 430. On the other hand, when the specific field data does not match the content data, the comparator 420 outputs a compared result indicating non-matching to the pointer and hit signal generator 430. Finally, for all items, the comparator 420 outputs compared results and positional information on positions where the content data are stored in the content table 410 to the pointer and hit signal generator 430.

When it is determined that there is a matched item among items constituting the content table 410 on the basis of the compared result and positional information input from the comparator 420, the pointer and hit signal generator 430 generates a pointer and a hit signal. The hit signal indicates that there is the matched item and the pointer indicates positional information on the corresponding item.

The packet classification rule search unit 130 receives specific field data, packet analysis data, ingress/egress port information data, and logical link information data from the packet analysis and specific field extraction unit 110, and pointers and hit signals from the pluralities of single field search units 120. In this case, the packet classification rule search unit 130 determines whether predetermined key data including pluralities of data and pointers has a desired value or type. The packet classification rule search unit 130 performs the above-described process to determine whether items that satisfy the predetermined condition exist in the predetermined table. When it is determined that the items exist, the packet classification rule search unit 130 outputs classes for the corresponding items. That is, when the predetermined is key data is matched with specific rule data in the packet classification rule table, the packet classification rule search unit 130 outputs a class corresponding thereto.

The packet classification rule table is a table that is used to classify into classes packets, which include packet classification rule data that includes pointers, packet analysis data, specific field data, ingress/egress port information data, and logical link information data output from the pluralities of single field search units 120.

The class indicates a predetermined value that is set by mutual agreement with devices that provide a QoS. When there is no rule data matched with the predetermined key data, a signal informing that there is no rule data and a default class are output.

Figure 5:
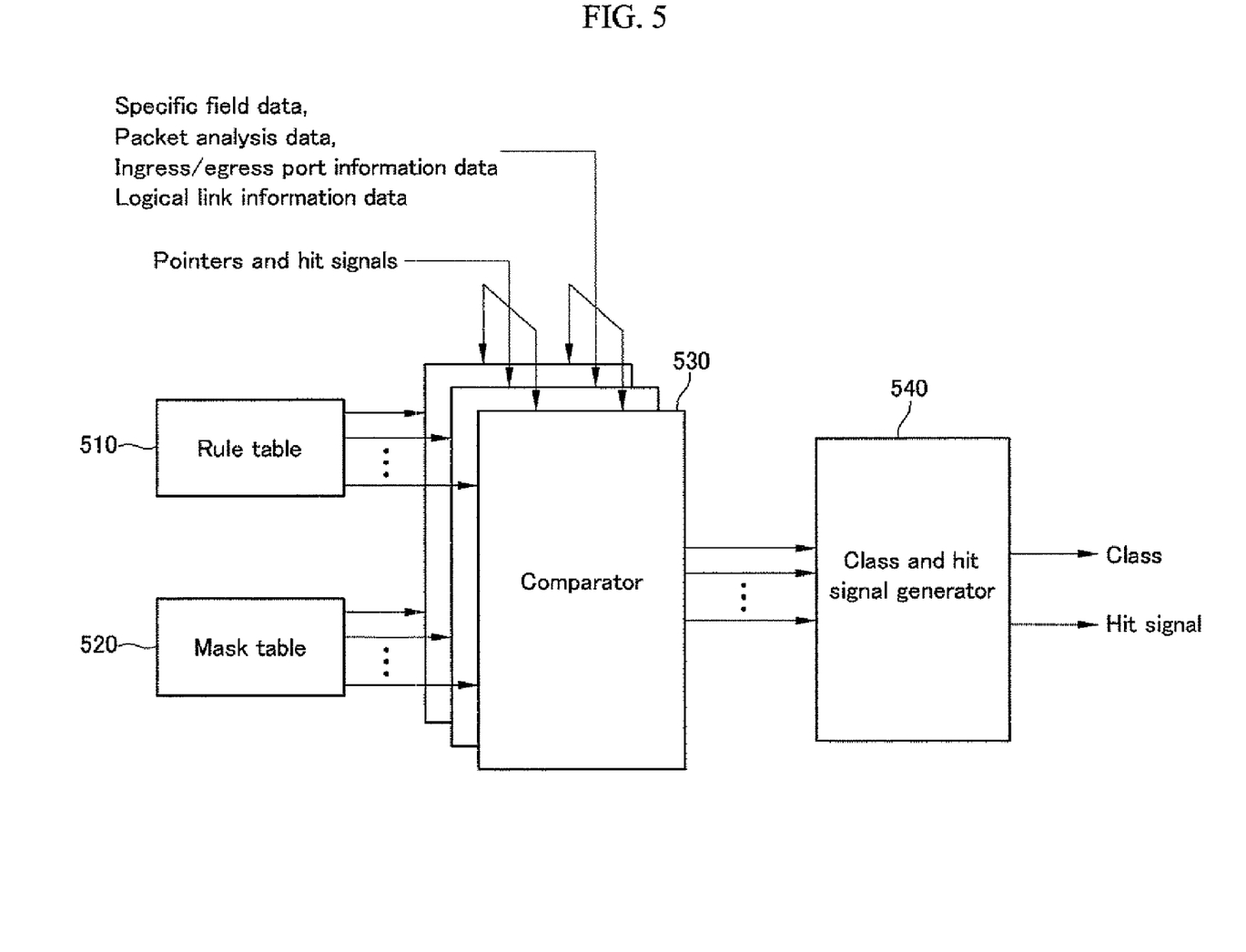
FIG. 5 is a block diagram illustrating a structure of a packet classification rule search unit according to an exemplary embodiment of the present invention.

FIG. 5 is a block diagram illustrating a structure of a packet classification rule search unit 130 according to an exemplary embodiment of the present invention. As shown in FIG. 5, the packet classification rule search unit 130 includes a rule table 510, a mask table 520, a comparator 530, and a class and hit signal generator 540.

The rule table 510 stores rule data that have values or types to be compared with specific field data, packet analysis data, ingress/egress port information data, and logical link information data input from the packet analysis and specific field extraction unit 110, and predetermined key data including pointers input from the pluralities of single field search units 120. The mask table 520 stores masks that are used to mask elements constituting the key data and rule data, that is, the pluralities of data and pointers. The sizes of the rule table 510 and the mask table 520, that is, the number of items constituting the rule table 510 and the number of items constituting the mask table 520, are the same.

The comparator 530 receives specific field data, packet analysis data, ingress/egress port information data, and logical link information data from the packet analysis and specific field extraction unit 110, and pointers and hit signals from the pluralities of single field search units 120. In this case, the comparator 530 constructs key data that includes pluralities of data and pointers as elements, reads rule data and masks from the rule table 510 and the mask table 520, respectively. The comparator 530 masks a portion of the elements constituting the key data and rule data using the masks and compares each of non-masked elements among the elements constituting the key data with each of non-masked elements among the elements constituting the rule data, item by item. For each element, the comparator 530 outputs a compared result indicating matching when each of the non-masked elements of the key data matches each of the non-masked elements of the rule data or a compared result indicating non-matching when each of the non-masked elements of the key data does not match each of the non-masked elements of the rule data. For each item, the comparator 530 outputs a compared result indicating matching when all of the compared results for the elements indicate matching or a compared result indicating non-matching when at least one of the compared results for the elements indicates non-matching. Finally, for all items, the comparator 530 outputs compared results and positional information on positions where the rule data are stored in the rule table 510 to the class and hit signal generator 540.

When it is determined that there are matched items among items constituting the rule table 510 on the basis of the compared results and positional information input from the comparator 530, the class and hit signal generator 540 generates classes and hit signals. The hit signals indicate that there are matched items, and the classes indicate predetermined values that are set by mutual agreement with devices that provide a QoS for the items.

Figure 6:
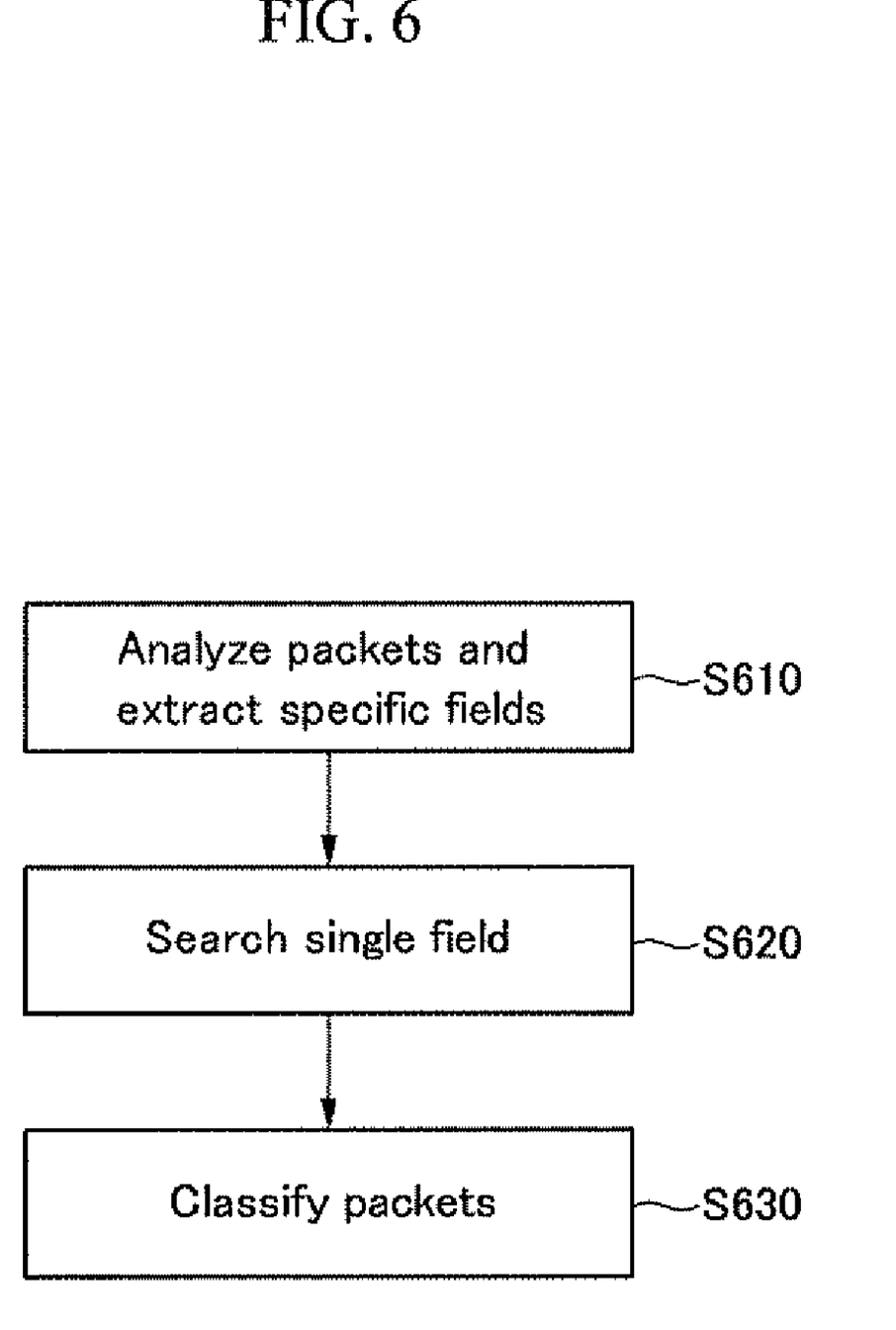
FIG. 6 is a flowchart illustrating a packet classification method according to an exemplary embodiment of the present invention.

Next, a packet classification method according to an exemplary embodiment of the present invention will be described with reference to FIG. 6. FIG. 6 is a flowchart illustrating a packet classification method according to an exemplary embodiment of the present invention.

The packet analysis and specific field extraction unit 110 analyzes input data packets and extracts specific fields from the input data packets (S610).

The packet analysis and specific field extraction unit 110 analyzes headers of various packets in layers ranging from the layer 2 to the layer 4, and searches and extracts specific fields at desired positions from the data packets on the basis of the analyzed data. Further, the packet analysis and specific field extraction unit 110 stores some data that is needed to classify packets during a process of analyzing headers of the packets. The packet analysis and specific field extraction unit 110 stores physical ingress/egress port information data of a switch or a router as network equipment and logical link information data. A portion of the extracted specific field data is output to the pluralities of single field search units 120 and another portion is output to the packet classification rule search unit 130. The stored packet analysis data, the ingress/egress port information data, and the logical link information data are output to the packet classification rule search unit 130.

Examples of representative specific fields that are used to classify packets include a destination MAC address, a source MAC address, a virtual LAN identifier (VLAN ID), a virtual LAN user priority (VLAN user priority), an Ethernet type, an IP precedence, a differentiated service code point (DSCP), an IP type, a source IP address, a destination IP address, a layer-4 source port, and a layer-4 destination port.

A portion of the specific fields is processed by the single field search unit 120 and the rest is directly processed by the packet classification rule search unit 130.

The fields processed by the single field search unit 120 and the fields directly processed by the packet classification rule search unit 130 are classified according to the following criterion. The fields that are processed by the single field search unit 120 may be sufficiently applied to the predetermined QoS policy even when considering only a relatively limited range or some kinds as compared with a range or kinds of values of the fields. The fields that are directly processed by the packet classification rule search unit 130 should consider an entire range or all kinds of values of the fields.

The packet classification apparatus performs a prefix match search on a destination MAC address, a source MAC address, a source IP address, and a destination IP address, simultaneously performs a range match search and an exact match search on the layer-4 source port and the layer-4 destination port among the specific fields, and performs an exact match search on a virtual LAN identifier, an Ethernet type, and an IP type, among the specific fields. The is specific fields that are processed by the single field search unit 120 are processed by the single field search unit 120 that is suitable for individual characteristics.

The virtual LAN user priority, the IP precedence, and the differentiated service code point among the specific fields do not need to be preprocessed by the single field search unit but are directly processed by the packet classification rule search unit 130.

Among the extracted specific field data, the packet analysis and specific field extraction unit 110 outputs specific field data where a prefix match search is needed to the single field search unit 121 that performs the prefix match search, specific field data where a range match search is needed to the single field search unit 122 that performs the range match search, and specific field data where an exact match search is needed to the single field search unit 123 that performs the exact match search. The packet analysis and specific field extraction unit 110 directly outputs the other specific field data to the packet classification rule search unit 130.

The pluralities of single field search units 120 perform a single field search to determine whether there are items that satisfy the predetermined condition with respect to the specific fields input from the packet analysis and specific field extraction unit 110 (S620).

Examples of a single field search method include a prefix match search, a range match search, and an exact match search. Hereinafter, a description will be given for each method.

First, the single field search unit 121 that performs the prefix match search converts specific field data into bits and masks some bits, and inspects only the other bits to determine whether the specific field data has a desired value or type. If items that satisfy the predetermined condition exist in the predetermined table, the single field search unit 121 outputs hit signals and pointers for the corresponding items.

If receiving the specific field data, the comparator 230 of the single field search unit 121 that performs the prefix match search reads masks and content data from the mask table 220 and the content table 210. At this time, the comparator 230 simultaneously reads masks and content data corresponding to items at the same positions in the individual tables. The comparator 230 masks some bits of the specific field data and the content data using the masks, and compares non-masked bits of the specific field data with non-masked bits of the content data, item by item. For each item, when the non-masked bits of the specific field data matches the non-masked bits of the content data, the comparator 230 outputs a compared result indicating matching. On the other hand, when the non-masked bits of the specific field data does not match the non-masked bits of the content data, the comparator 230 outputs a compared result indicating non-matching.

Table 7 shows the operation of bit-unit basic logic elements of the comparator 230. The result from the comparator 230 corresponds to a result that is obtained by performing an AND operation on the results from the basic logic elements. If an output from the comparator 230 is "1", it indicates matching, and if the output is "0", it indicates non-matching.

TABLE 7

| Bits of specific field data | Bits of content data | Bits of mask | Results of basic logic elements |
|---|---|---|---|
| 0 | 0 | 0 | 1 |
| 0 | 1 | 0 | 0 |
| 1 | 0 | 0 | 0 |
| 1 | 1 | 0 | 1 |
| Don't care | Don't care | 1 | 1 |

The single field search unit 121 that performs the prefix match search may include one comparator 230, such that the single field search unit 121 uses the comparator 230 to repeatedly perform a process of sequentially reading data of all items constituting the mask table 220 and the content table 210 one by one and comparing the read data with the same specific field data. The single field search unit 121 may include as many comparators 230 as the items constituting the mask table 220 and the content table 210, such that the single field search unit 121 uses the comparators 230 to perform a process of simultaneously reading data of all the items constituting the mask table 220 and the content table 210 and comparing the read data with the same specific field data without repetition of the process.

The number of comparators 230 is determined at a level at which so-called wire-speed can be satisfied. That is, the number of comparators 230 needs to be determined such that a comparison process on all the items of the mask table 220 and the content table 210 can be completed during minimal time intervals of packets when the packets are input to the packet classification apparatus.

The comparator 230 transmits a compared result indicating matching or non-matching on each item and positional information on a position where each item is stored in the content table 210 to the pointer and hit signal generator 240. When as many comparators 230 as the items of the table are included, the results from the comparators 230 also show positional information on the corresponding items.

When it is determined that there are matched items on the basis of the compared results and positional information transmitted from the comparator 230, the pointer and hit signal generator 240 generates pointers and hit signals. The hit signals indicate that there are matched items and the pointers indicate positional information on the corresponding items.

When there are pluralities of matched items, the pointer and hit signal generator 240 determines priorities of the items and outputs pointer for the items whose priorities are high. In order to reduce the number of hardware logics that constitutes the apparatus, the priority of each item is determined when each content data is written in the content table 210 so as to allow the items having high priorities to be located at upper or lower addresses. When ten number of hardware logics is not restricted, the pointer and hit signal generator 240 may include a separate table in which priorities can be given to all items. The pointer and hit signal generator 240 may compare the priorities of the items indicating matching and output pointers of the items whose priorities are high.

When there are pluralities of matched items, the pointer and hit signal generator 240 determines the priorities of the items and outputs hit signals and pointers for the pluralities of items whose priorities are high. The number of output pointers is determined by a user, but is fixed during the operation.

For example, when the number of items that constitute the content table 210 is 100, the pointer and hit signal generator 240 may be configured to output pointers for 10 items whose priorities are high among the matched items. In this case, when there are 20 matched items, the pointer and hit signal generator 240 outputs pointers for 10 items whose priorities are high, and when there are 8 matched items, the pointer and hit signal generator 240 outputs hit signals and pointers for the matched 8 items but does not output hit signals for the other two items to indicate that the other two items are mismatched.

Next, a range match search method will be described.

When receiving specific field data from the packet analysis and specific field extraction unit 110, the single field search unit 122 that performs the range match search determines whether a value of the specific field data is within a range of desired values. When items that satisfy the predetermined condition exist in the predetermined table, the single field search unit 122 outputs hit signals and pointers for the corresponding items.

When receiving the specific field data from the packet analysis and specific field extraction unit 110, the comparator 330 of the single field search unit 122 that performs the range match search reads upper bound values and lower bound values from the upper bound table 310 and the lower bound table 320, respectively. At this time, the comparator 330 simultaneously reads the upper bound values and the lower bound values corresponding to the items at the same positions from the upper bound table 310 and the lower bound table 320. The comparator 330 simultaneously compares the specific field data with the upper bound value and the lower bound value, item by item. For each item, when the specific field data satisfies the predetermined condition, that is, a value of the specific field data is smaller than or equal to the upper bound value and equal to or larger than the lower bound value, the comparator 330 outputs a compared result indicating matching. On the other hand, when the specific field data does not satisfy the predetermined condition, the comparator 330 outputs a compared result indicating non-matching.

The single field search unit 122 that performs the range match search may include one comparator 330, such that the single field search unit 122 uses the comparator 330 to repeatedly perform a process of sequentially reading values of all items constituting the upper bound table 310 and the lower bound table 320 one by one and comparing each of the read values with a value of the same specific field data. The single field search unit 122 may include as many comparators 330 as the items constituting the upper bound table 310 and the lower bound table 320, such that the single field search unit 122 uses the comparators 330 to perform a process of simultaneously reading values of all the items constituting the upper bound table 310 and the lower bound table 320 and comparing each of the read values with a value of the same specific field data without repetition of the process. The number of comparators 330 is determined at a level at which wire-speed can be satisfied. That is, the number of comparators 330 needs to be determined such that a comparison process on all the items of the upper bound table 310 and the lower bound table 320 can be completed during minimal time intervals of packets when the packets are input to the packet classification apparatus.

The comparator 330 transmits a compared result indicating matching or non-matching on each item and positional information on a position where each item is stored in the table to the pointer and hit signal generator 340. When as many comparators 330 as the items of the table are included, the results from the comparators 330 also show positional information on the corresponding items.

When it is determined that there are matched items on the basis of the compared results and positional information transmitted from the comparators 330, the pointer and hit signal generator 340 generates pointers that indicate positional information for the corresponding items and hit signals that indicate there are matched items.

When there are pluralities of matched items, the pointer and hit signal generator 340 determines priorities of the items and outputs pointers for the items whose priorities are high. In order to reduce the number of hardware logics to constitute an apparatus, the priority of each item is determined when each upper and lower bound value is written in the table so as to allow the items whose priorities are high to be located at upper or lower addresses of the corresponding table. When the number of hardware logics is not restricted, the pointer and hit signal generator 340 may include a separate table in which priorities can be given to all items. The pointer and hit signal generator 340 may be configured to compare the priorities of the items indicating matching and output pointers for the items whose priorities are high.

When there are pluralities of matched items, the pointer and hit signal generator 340 determines the priorities of the items and outputs hit signals and pointers for the pluralities of items whose priorities are high. The number of output pointers is determined by a user, but is fixed during the operation.

For example, when the number of items that constitute the upper bound table 310 or the lower bound table 320 is 100, the pointer and hit signal generator 340 may be configured to output pointers for 10 items whose priorities are high among the matched items. In this case, when there are 20 matched items, the pointer and hit signal generator 340 outputs pointers for 10 items whose priorities are high, and when there are 8 matched items, the pointer and hit signal generator 340 outputs hit signals and pointers for the matched 8 items but does not output hit signals for the other two items to indicate that the other two items are mismatched.

Next, an exact match search method will be described.

When receiving specific field data from the packet analysis and specific field extraction unit 110, the single field search unit 123 that performs the exact match search determines whether the specific field data has a desired value or type. When an item that satisfies the predetermined condition exists in the predetermined table, the single field search unit 123 outputs a hit signal and a pointer for the corresponding item.

When receiving the specific field data from the packet analysis and specific field extraction unit 110, the comparator 420 of the single field search unit 123 that performs the exact match search reads content data from the content table 410. The comparator 420 compares the specific field data with the content data, item by item. For each item, when the specific field data matches the content data, the comparator 420 outputs a compared result indicating matching. On the other hand, when the specific field data does not match the content data, the comparator 420 outputs a compared result indicating non-matching.

The single field search unit 123 that performs the exact match search may include one comparator 420, such that the single field search unit 123 uses the comparator 420 to repeatedly perform a process of sequentially reading data of all items constituting the content table 410 one by one and comparing the read data with the specific field data. The single field search unit 123 may include as many comparators 420 as the items constituting the content table 410, such that the single field search unit 123 uses the comparators 420 to perform a process of simultaneously reading data of all the items constituting the content table 410 and comparing the read data with the specific field data without repetition of the process. The number of comparators 420 is determined at a level at which wire-speed can be satisfied. That is, the number of comparators 420 needs to be determined such that a comparison process on all the items of the content table 410 can be completed during minimal time intervals of packets when the packets are input to the packet classification apparatus.

The comparator 420 transmits a compared result indicating matching or non-matching on each item and positional information on a position where each item is stored in the table to the pointer and hit signal generator 430. When as many comparators 420 as the items of the content table 410 are included, the results from the comparators 420 also show positional information on the corresponding items.

When it is determined that there is a matched item on the basis of the compared results and positional information transmitted from the comparators 420, the pointer and hit signal generator 430 generates a pointer and a hit signal. The hit signal indicates that there is a matched item and the pointer indicates positional information on the corresponding item. According to the exact match search method, there may be only one matched item. Accordingly, the single field search unit 123 that performs the exact match search generates one pointer and hit signal.

The packet classification rule search unit 130 compares the specific field data and the pointers with the rule data in the rule table and classifies packets (S630).

The packet classification rule search unit 130 receives specific field data, packet analysis data, ingress/egress port information data, and logical link information data from the packet analysis and specific field extraction unit 110, and pointers and hit signals from the pluralities of single field search units 120. In this case, the packet classification rule search unit 130 determines whether predetermined key data including the pluralities of data and pointers has a desired value or type. At this time, when items that satisfy the predetermined condition exist in the predetermined table, the packet classification rule search unit 130 outputs classes for the corresponding items. The classes indicate predetermined values that are set by mutual agreement with devices that provide a QoS.

When data or pointers that constitute the key data are called elements, rule data in a rule table 510 of the packet classification rule search unit 130 is composed of the same elements as the key data. In addition, masks that are stored in the mask table 520 of the packet classification rule search unit 130 are used to mask elements that constitute the key data and the rule data. For example, when each of the key data and the rule data is composed of n elements, a mask is composed of n bits and each bit of the mask is used to mask each element of the key data or rule data.

When the single field search unit 121 that performs the prefix match search performs the prefix match search on input single field data, if there are pluralities of matched items, the single field search unit 121 outputs pointers for the items whose priorities are high. When the single field search unit 122 that performs the range match search performs the range match search on input single field data, if there are pluralities of matched items, the single field search unit 122 outputs pointers for the items whose priorities are high. As such, as the single field search result on the single field data, pluralities of pointers are included in the key data. However, the pluralities of pointers on the single field data are managed as one element.

The comparator 530 of the packet classification rule search unit 130 receives specific field data, packet analysis data, ingress/egress port information data, and logical link information data from the packet analysis and specific field extraction unit 110, and pointers and hit signals from the pluralities of single field search units 120. In this case, the comparator 530 constitutes key data that includes the pluralities of data and the pointers as elements and reads the rule data and the masks from a rule table 510 and a mask table 520, respectively. At this time, the comparator 530 simultaneously reads the masks and rule data corresponding to the items at the same positions from the rule table 510 and the mask table 520. The comparator 530 uses the masks to mask some elements of the key data and the rule data and compares each of non-masked elements of the key data with each of non-masked elements of the rule data, item by item. For each element, the comparator 530 outputs a compared result indicating matching when each of the non-masked elements of the key data matches each of the non-masked elements of the rule data or a compared result indicating non-matching when each of the non-masked elements of the key data does not match each of the non-masked elements of the rule data. For each item, the comparator 530 outputs a compared result indicating matching when all of the compared results for the elements indicate matching or a compared result indicating non-matching when at least one of the compared results for the elements indicates non-matching. The process of comparing the masked elements of the key data and the masked elements of the rule data is performed, but a compared result is not included in an output result of the comparator 530.

The hit signals that are input to the comparator 530 indicates whether each of the pointers transmitted from the pluralities of single field search units 120 has an effective value indicating matching. Accordingly, even though one pointer on the key data is matched with one pointer on the rule data corresponding thereto in the comparison process, if the hit signals on the pointers are not transmitted, a compared result between the two pointers indicates non-matching. As described above, when the two pointers are masked using the masks corresponding thereto, a compared result between the two pointers always indicates matching.

If the comparator 530 receives pluralities of pointers corresponding to items having high priorities, among items indicating matching, from the single field search unit 121 that performs the prefix match search as a result obtained by performing the prefix match search, the comparator 530 simultaneously compares pointers corresponding to the pluralities of pointers on the rule data with the pluralities of pointers. In this case, when there is at least one matched pointer, the comparator 530 outputs a compared result on the element indicating matching. If the comparator 530 receives pluralities of pointers corresponding to items having high priorities, among items indicating matching, from the single field search unit 122 that performs the range match search as a result obtained by performing the range match search, the comparator 530 simultaneously compares pointers corresponding to the pluralities of pointers on the rule data with the pluralities of pointers. In this case, when there is at least one matched pointer, the comparator 530 outputs a compared result on the element indicating matching.

The packet classification rule search unit 130 may include one comparator 530, such that the packet classification rule search unit 130 uses the comparator 530 to repeatedly perform a process of sequentially reading masks and rule data of all items constituting the rule table 510 and the mask table 520 one by one and comparing the read data and masks with the key data. The packet classification rule search unit 130 may include as many comparators 530 as the items constituting the rule table 510 and the mask table 520, such that the packet classification rule search unit 130 uses the comparators 530 to perform a process of simultaneously reading the masks and the rule data of all the items constituting the rule table 510 and the mask table 520 and comparing the read data and masks with the same key data without repetition of the process.

The number of comparators 530 is determined at a level at which wire-speed can be satisfied. That is, the number of comparators 530 needs to be determined such that a comparison process on all the items of the rule table 510 can be completed during minimal time intervals of packets when the packets are input to the packet classification apparatus.

The comparator 530 transmits a compared result indicating matching or non-matching on each item and positional information on a position where each item is stored in the rule table 510 to the class and hit signal generator 540. When as many comparators 530 as the items of the table are included, the results from the comparators 530 may also show positional information on the corresponding items.

When it is determined that there are matched items on the basis of the compared result and positional information transmitted from the comparator 530, the class and hit signal generator 540 generates classes and hit signals. The hit signals indicate that there are matched items and the classes indicate predetermined values that are set by mutual agreement with devices that provide a QoS.

The class and hit signal generator 540 includes a predetermined class table. The predetermined class table stores the classes, and the classes are determined by a user on the basis of the predetermined classification rule written in the rule table. The positional information output from the comparator 530 reflects the classification rule. When receiving the positional information from the comparator 530, the class and hit signal generator 540 reads a class stored at the position corresponding to the positional information from the class table and outputs the class.

In FIG. 5, when there are pluralities of matched items, the class and hit signal generator 540 determines priorities of the items and outputs the class for the item whose priority is most high. In order to reduce the number of hardware logics to constitute an apparatus, the priority of each item is determined when each rule data is written in the class table so as to allow the items whose priorities are high to be located at upper or lower addresses of the class table. Meanwhile, when the number of hardware logics is not restricted, the class and hit signal generator 540 may include a separate table in which priorities can be given to all items. The class and hit signal generator 540 may be configured to compare the priorities of the items indicating matching and output class for the item whose priority is most high.

The exemplary embodiment of the present invention that has been described above may be implemented by not only an apparatus and a method but also a program capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for classifying packets, comprising:
 a first unit that analyzes input data packets, extracts pluralities of specific fields from the input data packets using an analyzed result, and outputs the pluralities of extracted specific fields;
 pluralities of second units that compare data of a first portion of the pluralities of extracted specific fields with data in a table, determine whether items that satisfy a predetermined condition exist in the table, and output hit signals and pointers indicating positions of the items that satisfy the predetermined condition when the items that satisfy the predetermined condition exist in the table where the hit signals indicate there are matched items among items constituting the table and the pointers have an effective value; and
 a third unit that compares key data including a second portion of the pluralities of extracted specific fields and the pointers input from the pluralities of second units with rule data in a rule table, determines whether items that satisfy a predetermined condition exist in the rule table, and outputs classes corresponding to the items when the items that satisfy the predetermined condition exist in the rule table,
 wherein the pluralities of second units comprise:
  a first single field search unit that performs a prefix match search, wherein the first single field search unit comprises:
> a mask table that stores masks used to mask bits of data of a third portion the pluralities of extracted specific fields;
>
> a content table that stores data that have values or types to be compared with the data of the third portion of the pluralities of extracted specific fields;
>
> a comparator that reads masks and content data from the mask table and the content table, respectively, and, item by item, masks bits of the data of the third portion of the pluralities of extracted specific fields and bits of the content data using the masks, compares a non-masked portion of the data of the third portion of the pluralities of extracted specific fields with a non-masked portion of the content data and outputs a compared result indicating matching when the non-masked portion of the data of the third portion of the pluralities of extracted specific fields matches the non-masked portion of the content data or a compared result indicating non-matching when the non-masked portion of the data of the third portion of the pluralities of extracted specific fields does not match the non-masked portion of the content data, and, for all items, outputs compared results and positional information on positions where the content data are stored in the content table; and
>
> a pointer and hit signal generator that generates the hit signals and pointers, when it is determined that there are matched items among items constituting the content table on the basis of the compared results and the positional information;

a second single field search unit that performs a range match search; and a third single field search unit that performs an exact match search.

2. The apparatus of claim 1, wherein, when there are pluralities of matched items, the pointer and hit signal generator determines priorities of the items and outputs hit signals and pointers for items whose priorities are high.

3. The apparatus of claim 1, wherein
> the first unit further outputs ingress/egress port information data and logical link information data, and
>
> the key data further includes the ingress/egress port information data and the logical link information data.

* * * * *